UNITED STATES PATENT OFFICE.

EDWIN HAWKER, OF LEE, ASSIGNOR TO CORNELIUS HANBURY, OF LONDON, ENGLAND.

IMPROVEMENT IN CONFECTIONERY.

Specification forming part of Letters Patent No. 168,488, dated October 5, 1875; application filed September 13, 1875.

*To all whom it may concern:*

Be it known that I, EDWIN HAWKER, of Lee, in the county of Kent, England, have invented an Improvement in Confectionery, of which the following is a specification:

My present invention relates to an improved coating for jujubes and other confectionery of a deliquescent character.

In Letters Patent of the United States No. 166,365, granted to me on the 3d day of August, 1875, I have described coating, incasing, or covering such confectionery with gum, gelatine, albumen, or other animal or vegetable matter soluble in water.

My present invention consists in coating, incasing, or covering certain kinds of jujubes, gum goods, and other kinds of sticky sweetmeats, such as boiled-sugar confectionery, black-currant lozenges, chocolate, or other confectionery of a deliquescent character, with a material soluble in alcohol or other spirit, in order to obtain results superior to those obtained by my former invention. The substances or materials which I use are shellac, or the varieties of the same substance known as gum-lac, seed-lac, or stick-lac, or certain other equivalent resins, such as colophony, resin, or a solution of pyroxyline in ether and alcohol, or other matter soluble in alcohol.

If I use shellac, gum-lac, seed-lac, stick-lac, or resin, such as pure colophony-resin, (I consider shellac generally preferable, because of its greater purity,) I proceed as follows: To prepare the solution, I take about two and one-half ounces of the lac, more or less, according to the class of goods to be coated, or a much smaller proportion, say one-fourth ounce of the resin, and steep the lac or resin, or both of them, in one pint of alcohol, by preference sixty degrees over proof, at a suitable temperature. I call this the lac or resin solution. When prepared at a temperature not exceeding 80° Fahrenheit this solution is turbid. I prefer, generally, to use it in its turbid condition; but, if desired, it can be prepared at a temperature not exceeding 190° Fahrenheit, when the solution will be a clear one. The solution may be used either hot or cold. If I use pyroxyline I take forty grains of pyroxyline and dissolve it in a mixture of six ounces ether and ten ounces alcohol. Methylated ether and alcohol will do.

Having now described the mode of preparing the various solutions required, I will describe the mode in which I apply them, or any one or more of them, to the various goods to be coated or incased, and to indicate the special advantage of each of these solutions. I employ these solutions to render sticky or adhesive kinds of jujubes, gum goods, boiled-sugar confectionery, and other sweetmeats less adhesive, or, in certain cases, really non-adhesive, and to prevent them from losing their moisture, and so becoming hard and brittle when exposed to dry air, or from absorbing excess of moisture, and so gradually melting, or softening, or dissolving, when exposed to moist air, and to improve their appearance.

The class of goods to which I consider the application of my invention most valuable is jujubes or gum goods of certain kinds, whether in the "sheet," "cut," "stamped," "molded," or "pastile" form. If the gum goods are in sheet form, I prefer to use the lac or resin solution before described, which is cheaper than gelatine or isinglass, and gives more satisfactory results. I dip or immerse the goods in this solution, and then allow them to dry, and, if desirable, give them a second or third coating in the same way. The lac or resin solution dries very rapidly, and leaves an extremely thin film of lac or resin over the surface of the sheet goods, which enables them to be packed in boxes for many months without adhesion, while the quality and moisture of the goods are not impaired. I, of course, avoid as much as possible letting the goods be touched until the coating is dry.

The collodion or balsam solutions may also be used for this class of goods, though not generally with such good results as the lac or resin solution; or two or more coatings may, in some cases, be given with advantage—for instance, one of the lac or resin solution, and one of the albumen or other aqueous solution. This double coating is not necessary unless the jujubes are very soft, or have to be kept for a great length of time. If the gum goods or jujubes to be coated are in the cut, stamped, molded, or pastile form, I modify the method of dipping according to the solution which I intend to employ. If I use the lac or resin solution, or the diluted collodion, or the balsam solution, I place the gum goods or jujubes in a thin layer in a sieve, preferably a rather coarse horse-hair sieve, and immerse them for a few seconds in the solution, and, having shaken off the greater part of the said solution, I keep them in gentle motion in the sieve until the greater part of the alcohol has evaporated and the film has set.

The special advantages which I claim for these improvements in the manufacture of jujubes and other goods are, that I am enabled to render jujubes and other goods containing fruit substances in their composition, or other goods of a deliquescent character, less adhesive and more permanent than they are when coated by gum, gelatine, albumen, or other animal or vegetable matter soluble in water described in my former specification.

The following is what I claim as new, and desire to secure by Letters Patent—

Jujubes or other confections of a deliquescent character, coated with an alcoholic solution of a gum, or resin, or pyroxyline.

In testimony of which invention I hereunto set my hand this 10th day of August, 1875.

EDWIN HAWKER.

Witnesses:
 CHARLES EVE,
   37 *Lombard Street, London.*
 ALFD. BASTIN,
   37 *Lombard Street.*